(12) United States Patent
Sellnau et al.

(10) Patent No.: US 7,308,872 B2
(45) Date of Patent: Dec. 18, 2007

(54) METHOD AND APPARATUS FOR OPTIMIZED COMBUSTION IN AN INTERNAL COMBUSTION ENGINE UTILIZING HOMOGENEOUS CHARGE COMPRESSION IGNITION AND VARIABLE VALVE ACTUATION

(75) Inventors: Mark C. Sellnau, Bloomfield Hills, MI (US); Philip J. G. Dingle, Rochester, MI (US)

(73) Assignee: Delphi Technologies, Inc., Troy, MI (US)

( * ) Notice: Subject to any disclaimer, the term of this patent is extended or adjusted under 35 U.S.C. 154(b) by 265 days.

(21) Appl. No.: 11/027,109

(22) Filed: Dec. 30, 2004

(65) Prior Publication Data
US 2006/0144356 A1 Jul. 6, 2006

(51) Int. Cl.
*F01L 1/34* (2006.01)

(52) U.S. Cl. ............................... 123/90.16; 123/90.39; 123/90.44

(58) Field of Classification Search ............ 123/90.15, 123/90.16, 90.17, 90.18, 90.27, 90.31; 464/1, 464/2, 160
See application file for complete search history.

(56) References Cited

U.S. PATENT DOCUMENTS

| | | | | |
|---|---|---|---|---|
| 5,680,841 | A | * | 10/1997 | Hu .............................. 123/322 |
| 6,595,186 | B2 | * | 7/2003 | Hiyoshi et al. ......... 123/406.29 |
| 6,600,989 | B2 | * | 7/2003 | Sellnau et al. .............. 701/110 |
| 6,810,844 | B2 | | 11/2004 | Sellnau |
| 6,830,020 | B1 | | 12/2004 | El Tahry et al. |
| 2005/0183693 | A1 | * | 8/2005 | Yang et al. |

* cited by examiner

*Primary Examiner*—Ching Chang
(74) *Attorney, Agent, or Firm*—Paul L. Marshall

(57) ABSTRACT

A valvetrain system mechanization for an internal combustion engine using compression ignition, including homogeneous charge compression ignition, having two intake and one or more exhaust valves per cylinder. The valves are operated by dual overhead camshafts having two-step cams. The intake and exhaust camshafts are provided with phasers for varying the opening and closing of the intake and exhaust valves. A two-step roller finger follower is disposed for each valve between the cam lobes and the valve stem. The two sets of intake and exhaust valves are controlled by separate oil control valves. Swirl of gases may be introduced by mismatching the lifts of the valves. The valve opening times, closing times, lifts, fuel injection, compression ratio, and exhaust gas recirculation may be varied to optimize combustion conditions for a range of engine operating modes.

4 Claims, 19 Drawing Sheets

| Operating Mode | Mode Description | VVA Strategy | Combustion Strategy | Intake Lift 1 | Intake Lift 2 | Intake Phaser | ECR | Exhaust Lift 1 | Exhaust Lift 2 | Exhaust Phaser | EER | External EGR |
|---|---|---|---|---|---|---|---|---|---|---|---|---|
| 1 | Cold Start (CS) | Hi ECR for Max Comp Temps, EEVO for Cat Heating | Conventional | Default: Short | Default: VDA | Default: 330 | 19 | Default: Norm | Default: Norm | Default: 105 | 13 | OFF |
| 2 | Warm Idle | I-Swirl | Conventional | Long | VDA | Default: 330 | 15-16 | Norm | Norm | Retarded: 145 | 18 | OFF |
| 3 | Low Load (LL) | I-Swirl | Conventional | Long | VDA | Default: 330 | 15-16 | Norm | Norm | Retarded: 145 | 18 | OFF |
| 4 | Medium Load (ML) PCI | I-Swirl and E-Swirl; High Dilution | Premixed Diesel Combustion | Long | VDA | Retard: 360 | 10-11 | Norm | Long | Retarded: 145 | 18 | ON |
| 5 | Peak Torque (PT) | Best VE | Conventional | Long | Long | Retard: 345 | 13-14 | Long | Long | Default: 105 | 13 | OFF |
| 6 | Peak Power (PP) | Best VE | Conventional | Long | Long | Retard: 355 | 11-12 | Long | Long | Default: 105 | 13 | OFF |
| 7 | Acel Transient | EEVO & LEVC | Premixed Diesel Combustion | Long | VDA | Default: 330 | 15-16 | Long | Long | Default: 105 | 13 | ON |

FIG. 7

| Alternative | Description | Independent Valve Actuation | Hardware Eliminated | Functionality Lost |
|---|---|---|---|---|
| I | 2-Step Lift(I&E) & DICP | Intake Only | One OCV; Separate Oil Gallery on Exh | Exhaust Swirl Generation |
| II | 2-Step Lift (Intake Only) & DICP | Intake Only | Two OCVs; All 2S RFF for Exh.; Separate Oil Gallery on Exh | Capability for High Internal EGR; Exh Swirl Generation |
| III | 2-Step Lift (I&E) & DICP | No | Two OCVs; Separate Oil Galleries for I & E | VDA for Swirl (requires PDA addition); Exh Swirl; |
| IV | 2-Step Lift (Intake Only) & DICP | No | Three OCVs; All 2S RFF for Exh.; Separate Oil Galleries for I & E | Capability for High Internal EGR; VDA for Swirl (requires PDA addition); Exh Swirl; |
| V | Cyl Deactivation for Half Cyls & ECP | No | Two OCVs; Separate Oil Galleries for I & E; Half of all 2S RFF; | Cold Start Benefit; Var. LIVC for ECR Cntrl; High EGR Capability; VDA for Swirl (requires PDA); Exh Swirl |
| VI | 2-Step Swirl (I&E) with CDA & DICP | No | none | Exhaust Swirl Generation; VDA for Swirl (reqs PDA); |

FIG.16

METHOD AND APPARATUS FOR OPTIMIZED COMBUSTION IN AN INTERNAL COMBUSTION ENGINE UTILIZING HOMOGENEOUS CHARGE COMPRESSION IGNITION AND VARIABLE VALVE ACTUATION

TECHNICAL FIELD

The present invention relates to combustion in internal combustion engines; more particularly, to a variable valve actuation (VVA) and phasing system for a compression-ignited engine; and most particularly, to a simple method and apparatus incorporating variable valve actuation and camshaft phasing for optimizing and controlling compression-ignited combustion, and especially homogeneous charge compression ignition (HCCI) (also known as controlled autoignition) combustion, to reduce emissions of nitrogen oxides ($NO_x$) and particulate matter (PM), improve engine performance, and increase fuel efficiency over a range of engine operating modes.

BACKGROUND OF THE INVENTION

Advanced combustion processes are being developed in the engine combustion arts to reduce emissions of $NO_x$ and PM from both spark-ignited (SI) and compression-ignited (CI) engines, especially light-duty automotive engines. As used herein, "spark-ignited" and "spark ignition" refers to any internal combustion engine wherein ignition of a compressed combustible mixture of fuel and air in an engine cylinder occurs principally because of an electric discharge formed in the midst of the compressed combustible mixture. "Compression-ignited" and "compression ignition" refers to any internal combustion engine wherein ignition of a compressed combustible mixture of fuel and air occurs principally because some or all of the components of the compressed combustible mixture have been adiabatically compressed in a cylinder to a temperature at or above the spontaneous ignition temperature of the mixture. Thus, as used herein, "compression-ignited" and "compression ignition" should be taken to mean not only conventional prior art diesel ignition, wherein fuel is injected into a compressed air charge at substantially the top of the compression stroke to form a non-homogeneous mixture, but also all other compression-type ignition including but not limited to homogeneous charge compression ignition (HCCI), controlled autoignition (CAI), and premixed diesel (PMD) ignition.

HCCI-diesel is homogeneous charge CI using diesel fuel. It is mixed mode in that this engine must revert to conventional diesel combustion in some conditions. Fuel may be injected early to foster mixing. HCCI-diesel is controlled using VVA and other means such that the charge is diluted and combustion temperatures are low. This produces combustion with low soot and low NOx.

HCCI-gasoline is also homogeneous charge compression ignition but it uses gasoline. For certain conditions such as idle and higher loads, it reverts to conventional spark ignition. The combustion process is similar to HCCI-diesel but a lower pressure, and a lower cost injection system is utilized.

HCCI, whether HCCI-diesel or HCCI-gasoline, is known to be chemically-kinetically controlled. These combustion processes require special in-cylinder conditions, operate in critical ranges, and generally are difficult to control. If successful, however, HCCI promises drastically reduced emissions that may satisfy future US and European emissions standards. Avoidance of high cost and complexity is a significant challenge for many advanced engine concepts.

Advanced engines are foreseen and in development in the engine arts which may use diesel fuel, gasoline, mixtures thereof, or other specialty fuels. Fuel may be port-injected and/or cylinder-injected to foster homogeneous charge compression ignition (HCCI) or "controlled autoignition" (CAI) to provide controlled, low-temperature burning of the fuel. Hybrid engines may, for example, utilize homogeneous charge compression ignition (HCCI) in some operating modes and spark-ignition (SI) or conventional compression-ignition (CI) in other modes. Thus, the scope of the present invention applies to both conventional combustion modes and advanced premixed combustion modes for gasoline-fueled and diesel-fueled engines. A main need in the art is a simple solution to satisfy HCCI requirements while reducing cost and complexity of the overall powertrain.

Because combustion initiation is chemically-kinetically controlled, one problem of HCCI systems is that parameters other than fuel injection timing (as for conventional diesel engines) must be controlled in order to control combustion initiation. Mixture compression temperature and exhaust gas recirculation (EGR) level are two such control parameters. The Miller Cycle, known in the prior art, with variable late intake valve closing (LIVC) and turbo compounding can be used to control compression temperature over the engine operating range. The Miller Cycle with LIVC provides independent control of compression ratio (CR) and expansion ratio (ER), with CR generally lower than ER.

Currently, light-duty diesel engines operate with fixed geometric compression ratios of about 18:1 to about 22:1 in order to achieve good cold-starting characteristics. However, once warmed up, such compression ratios are excessively high and reduce thermodynamic efficiency due to high heat losses. Such high compression ratios contribute to higher peak cycle temperatures, which exacerbates $NO_x$ production. As with other internal combustion engines, the diesel engine operates within a peak cylinder pressure constraint that is dictated by structural strength considerations. In other words, higher CR demands a more massive, heavy, and expensive engine than lower CR.

Thus, a further need in the CI art is an engine having a lower CR when warmed to permit lower peak cylinder temperatures and pressures.

Variable LIVC is useful to provide high effective compression ratio (ECR) for good cold start characteristics, while providing lower ECR and lower compression temperatures for warmed-up operation. In some applications, the use of variable LIVC can eliminate the need for prior art glow plugs (GP) for engine starting. GP elimination has at least one important side benefit in that real estate is freed up on the engine head for a flush-mounted cylinder pressure transducer. Cylinder-pressure-based control may be necessary for optimal HCCI systems and is currently under study in the engine arts.

As noted above, EGR is an important control parameter for HCCI. Generally, HCCI systems require relatively high levels of exhaust gas recirculation, as high as 50% to 70%, and the combustion process is sensitive to small changes in EGR level. EGR can be used to control both combustion initiation and combustion burn rates, while also lowering flame temperatures for reduced $NO_x$ emissions. Prior art external EGR systems, wherein exhaust gas is metered from the exhaust manifold into the intake manifold, offer the advantage of cooling the exhaust gas for reduced $NO_x$, but these systems are bulky, expensive, and slow to respond.

Thus, a still further need in the art is means for rapid control of EGR introduction into the firing chamber for good transient response of advanced HCCI systems.

Another requirement of HCCI systems is in-cylinder swirl of intake gases to provide effective mixing of injected fuel and air. Swirl can be produced in the prior art by swirl ports, but such devices limit full-load airflow and engine power. Alternatively, port deactivation (PDA) can provide swirl by blocking one intake port of a two-intake-valve system with a butterfly valve, barrel valve, or slider valve. PDA systems are used widely in the prior art but they suffer from deposit accumulation downstream of the PDA device and may introduce a flow loss due to shafts or other mechanisms blocking airflow. Valve deactivation (VDA) is a preferred alternative method that involves deactivating one of the two intake valves. This method is advantageous because it avoids possible deposit problems and airflow restrictions.

Thus, a still further need in the art is a simple, inexpensive mechanism for providing valve deactivation of intake valves.

A desirable feature for advanced HCCI combustion systems is the ability to rapidly heat both the combustion chamber and the exhaust gas catalyst(s) during a cold start. Rapid heating of the combustion chamber walls can improve combustion within the first few seconds of operation during which the catalyst is inactive. Heating the catalyst more quickly shortens the time to catalyst light off and thereby shortens the period of uncatalyzed emissions.

One known method for heating the cylinder during a cold start is early exhaust valve closing (EEVC) through which hot burned gases are trapped in the cylinder just prior to fuel injection. This can be combined with increased effective compression ratio (ECR) by closing the intake valve near bottom dead center (early intake valve closing (EIVC)) for increased compression temperatures and good cold start characteristics.

One known method to accelerate heating the exhaust catalyst is early exhaust valve opening (EEVO), which effectively blows down the hot cylinder gases before expansion is complete. This can be combined with late combustion phasing for additional exhaust temperature increases.

Thus, a still further need in the art is a simple means for EEVC and EEVO.

Another problem with CI combustion in general, and HCCI combustion in particular, is the extremely low exhaust temperatures that are typically encountered for warmed-up conditions. Exhaust temperatures may drop below temperatures at which the catalyst is active, for example, while the engine is idling or at partial load. Exhaust temperatures below 150° C. are known to limit catalyst conversion efficiency.

As is known in the prior art, exhaust temperatures can be increased without a loss of engine efficiency by reducing trapped air mass in the cylinder. This enables lower air-fuel ratios at any fueling level and increases exhaust temperature. Some CI engines incorporate a throttle to reduce trapped air mass but throttling reduces engine efficiency. Alternatively, control of trapped air mass is possible by variable intake valve closing and variable charging using a variable nozzle turbocharger (VNT). Another method to increase exhaust temperature is cylinder deactivation (CDA), which effectively increases load factors in the remaining firing cylinders. Both approaches can be achieved by variable valve actuation mechanisms.

Thus, a still further need in the art is a simple means for providing variable valve actuation in a CI or HCCI engine.

Finally, while current diesel engines exhibit generally good low-speed torque compared to modern SI engines, greater levels of low-speed torque are highly valued in the industry. It is also desirable that such low-speed torque be available on demand without the effects of turbocharger lag and other transient effects. If the intake plenum is charged with fresh air plus conventionally-recirculated exhaust gas, several combustion cycles may be necessary to purge the EGR from the system, and this can contribute to poor or delayed torque response. EEVO, while useful for cold starts as described above, can also be used to quickly accelerate the turbocharger for improved torque response. To minimize prior art external EGR delay problems, at least a portion of the EGR can be delivered internally by VVA.

Thus, a still further need is a simple means for providing variable valve actuation in an HCCI engine to match valve events to combustion requirements for various operating conditions.

It is a principal object of the present invention to reduce emissions of oxides of nitrogen and particulates from an HCCI engine.

It is a further object of the present invention to improve cold start characteristics of an HCCI engine.

It is a still further object of the present invention to improve the performance characteristics of an HCCI engine.

It is a still further object of the present invention to reduce the cost and complexity of an HCCI engine.

SUMMARY OF THE INVENTION

Briefly described, a valvetrain system mechanization for a CI engine includes two engine intake valves and two engine exhaust valves per cylinder. The valves are operated by dual overhead camshafts (intake and exhaust) having "three-lobe" two-step cams for each valve wherein a central lobe is a high-lift or low-lift lobe and a pair of lateral lobes outboard of the central lobe are correspondingly low-lift or high-lift lobes. The lift of the high-lift lobe is greater than the lift of the low-lift lobes at any cam position. A conventional two-step roller finger follower (RFF) for varying selectively the lift of a valve between high-lift and low-lift by selective application or withholding of high-pressure oil to each RFF is disposed for each intake valve and each exhaust valve between the cam lobes and the valve stem.

Two separate oil control valves (OCV) independently control the pressurized oil supply to all the first and second intake valve RFFs, respectively, via two separate intake oil supply galleries in the engine head. Likewise, two additional separate oil control valves independently control the pressurized oil supply to all the first and second exhaust valve RFFs, respectively, via two separate exhaust oil supply galleries in the engine head. Thus, in-cylinder swirl of intake and/or exhaust gases may be introduced as desired by differentially lifting the two intake valves and/or the two exhaust valves. In-cylinder swirl is known in the diesel art as a useful adjunct to HCCI combustion. First intake RFFs are activated and deactivated by a first intake controllable OCV, and second intake RFFs are activated and deactivated by a second intake controllable OCV. First exhaust RFFs are activated and deactivated by a first exhaust controllable OCV, and second exhaust RFFs are activated and deactivated by a second exhaust controllable OCV. Thus the lift of all the intake valves may be selected between high lift and low lift; and, independently, the lift of all the exhaust valves may be selected between high lift and low lift. Preferably, the low lift for one of the intake valves is zero lift, or total valve deactivation.

Preferably, the intake camshaft and the exhaust camshaft are each provided with a conventional camshaft phaser for controllably varying the opening and closing points of the intake and exhaust valves during a 720° combustion cycle of the crankshaft.

A programmable engine control module (ECM) is provided by means of which the valve opening times, valve closing times, valve lifts, number and timing of fuel injection pulses, effective compression ratio, and exhaust gas recirculation may be varied independently to provide near-optimal combustion conditions for a wide range of engine operating modes. Combinations of conditions are provided for up to seven different engine-operating modes:
1. Cold Start
2. Warm Idle
3. Low Load
4. Medium Load
5. Peak Torque
6. Peak Power
7. Acceleration Transient

BRIEF DESCRIPTION OF THE DRAWINGS

The present invention will now be described, by way of example, with reference to the accompanying drawings, in which:

FIG. 7 is a chart showing operational states of engine components for the engine shown in FIGS. 1 through 3 for seven different Operating Modes;

FIGS. 9a,9b through 15a,15b show exemplary valve lift and timing as a function of crank position and also schematically for an individual engine cylinder for the seven Operating Modes shown in FIG. 7.

FIG. 16 is a chart showing six alternative engine configurations for meeting various improved performance objectives at differing engine costs and complexities;

DESCRIPTION OF THE PREFERRED EMBODIMENTS

Figure 1:
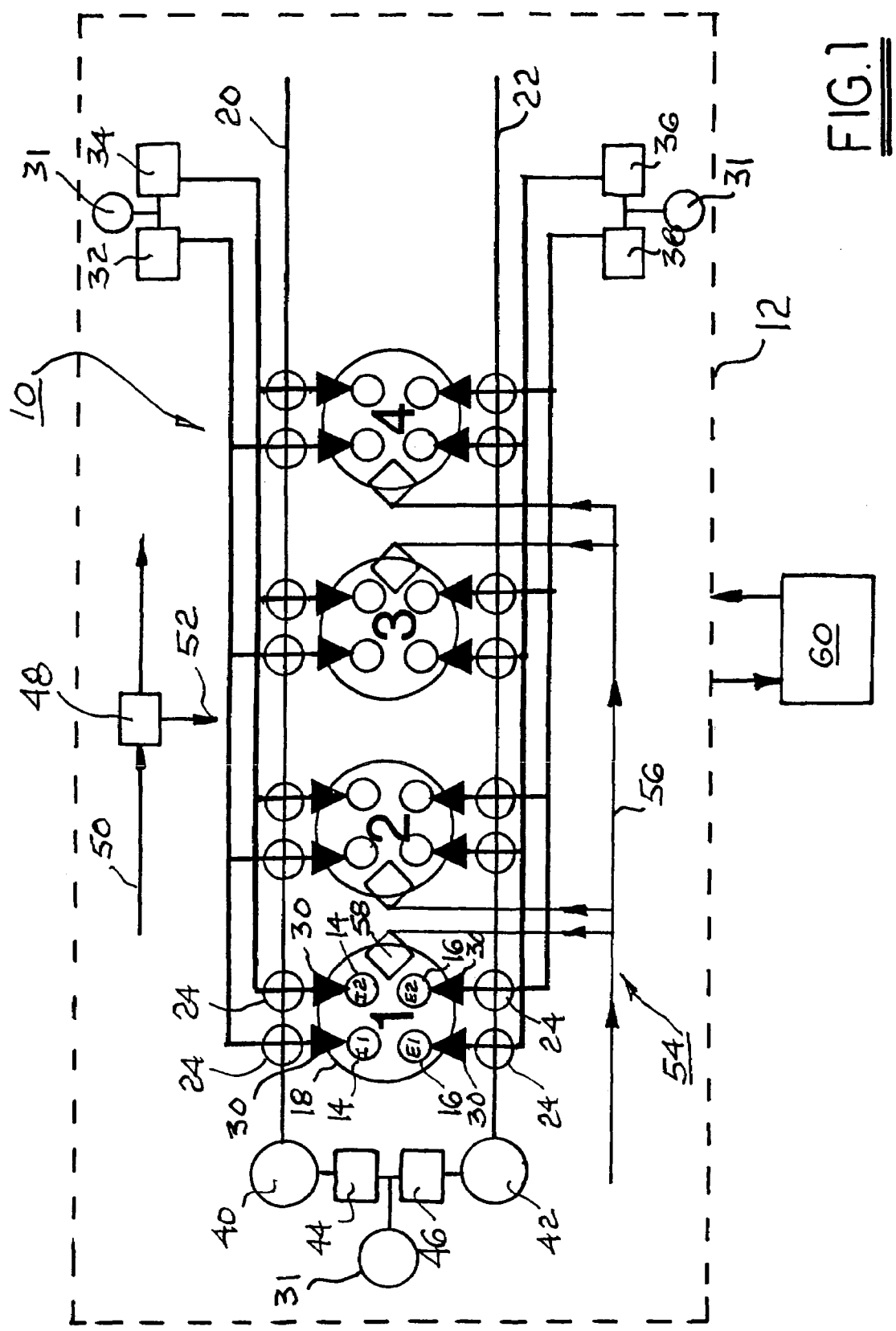
FIG. 1 is a schematic drawing of a four-cylinder compression-ignited engine in accordance with the invention.

In the following discussion, the mechanisms and strategies for varying valve lift and valve timing for a compression-ignited (CI) engine in accordance with the invention are presented in the context of light duty engines which may be operated in either conventional diesel ignition (DI) mode or homogeneous charge compression ignition (HCCI) mode, or combinations thereof depending upon engine speed and load. However, it should be understood that such novel mechanisms and strategies may also be applied to medium duty and heavy duty CI-type engines. Further, engines comprehended by the invention may be hybrids that utilize compression ignition under some operating conditions and spark ignition under other operating conditions. Further, such engines are not limited to diesel fuel and may be fueled by other fuels such as gasoline and/or specialty fuels. The term "specialty fuels" as used herein is defined to include blended fuels, as needed, to provided the desired autoignition properties in the fuel for use by the range of internal combustion engines described above.

Referring to FIGS. 1 through 4, a schematic drawing for valvetrain system mechanization 10 for a compression ignition engine 12 includes two engine intake valves 14, designated I1 and I2, and two engine exhaust valves 16, designated E1 and E2, per cylinder 18. The valves are operated by dual overhead camshafts (intake and exhaust) 20,22 having "three-lobe" two-step cams 24 for each valve wherein a central lobe 26 is a low-lift lobe and a pair of lateral lobes 28 outboard of the central lobe are high-lift lobes. A conventional two-step roller finger follower (RFF) 30 for varying selectively the lift of a valve between a high-lift and a lower lift, which may be zero lift, is disposed for each intake valve and each exhaust valve between the cam lobes and the valve stem 25. RFF 30 may have either sliding 35 or rolling 37 contact elements with cam lobes 26,28; a currently preferred embodiment includes rollers 39,41 in both the high-lift and low-lift elements of RFF 30. An exemplary valve train and two-step RFF suitable for use in method and apparatus of the invention is disclosed in U.S. Pat. No. 6,668,779, the relevant disclosure of which is incorporated herein by reference. Other two-step RFFs as may be known in the prior art, having variable lift capability of either the outboard contact elements or the central element, may also be suitable.

The RFFs for the I1 intake valves are activated and deactivated by a first controllable oil valve 32; the RFFs for the I2 intake valves are activated and deactivated by a second controllable oil valve 34; the RFFs for the E1 exhaust valves are controlled by a third oil control valve 36; and the RFFs for the E2 exhaust valves are controlled by a fourth oil control valve 38. Each oil control valve is connected to its respective RFFs via galleries formed in the engine head which terminate, for example, in hydraulic lash adjusters 33 which pivotably support the RFFs and through which actuating oil is supplied to the RFFs. The lifts of the I1 intake valves, I2 intake valves, E1 exhaust valves, and E2 exhaust valves may be selected independently between high lift and low lift. Thus, there are $2^4=16$ possible combinations of cam/valve actuations for the engine.

Preferably, for robust valve train operation over the engine lifetime, a dedicated oil lubrication system 31 is provided wherein contamination-free oil is circulated around the cylinder head and valve train system only, while carbon-contaminated lube oil is confined to the crankcase and remainder of the engine.

Preferably, the cam profiles for the I1 valves differ from the cam profiles for the I2 valves to provide desired performance combinations as described below. Similarly, the cam profiles for the E1 valves differ from the cam profiles for the E2 valves. Further, for some valves requiring total deactivation in some operating modes, the low-lift lobes 26 may be provided as zero-lift lobes. Still further, for a special case, an additional port deactivation (PDA) valve (not shown) as is known in the prior art may be combined with VVA to shut off the port (equivalent of zero-lift) when required.

The length of valve opening for both high and low lift may also be varied for each valve as desired, by appropriate grinding of the respective cam lobe. In addition, exhaust valves may have a prolonged opening (delayed closing), which overlaps the intake valve opening, by means of a suitably-shaped "bump" on the appropriate cam lobe. This may assist in providing a predetermined exhaust gas dilution of the incoming charge.

The intake camshaft 20 and the exhaust camshaft 22 are each provided with a conventional camshaft phaser 40,42, respectively, which may be either a spline-type phaser or a vane-type phaser, the latter being currently preferred, for controllably varying the opening and closing points of the intake and exhaust valves during a 720° combustion cycle of the crankshaft. Each phaser is controlled independently by a phaser oil control valve 44,46, respectively, supplied by oil system 31.

An exhaust gas recirculation valve 48 is provided for recirculating in known fashion a portion of the exhaust gas from the engine exhaust stream 50 into the engine intake manifold 52 as may be desired.

A fuel system 54 comprising a common fuel rail 56 or other HCCI-compatible fuel system for supplying fuel to cylinder fuel injectors 58 is provided in known fashion.

A programmable engine control module (ECM) 60 is provided by means of which the valve opening times, valve closing times, valve lifts, number and timing of fuel injection pulses, effective compression ratio, effective expansion ratio, and exhaust gas recirculation may be varied independently to provide near-optimal combustion conditions for a wide range of engine operating modes.

It should be noted that the individual engine components as just described need not in themselves be novel. In fact, it is an important consideration of the present invention that existing technology may be adapted and novelly combined, thereby minimizing the cost and complexity of providing much-improved engine operation.

Figure 4:
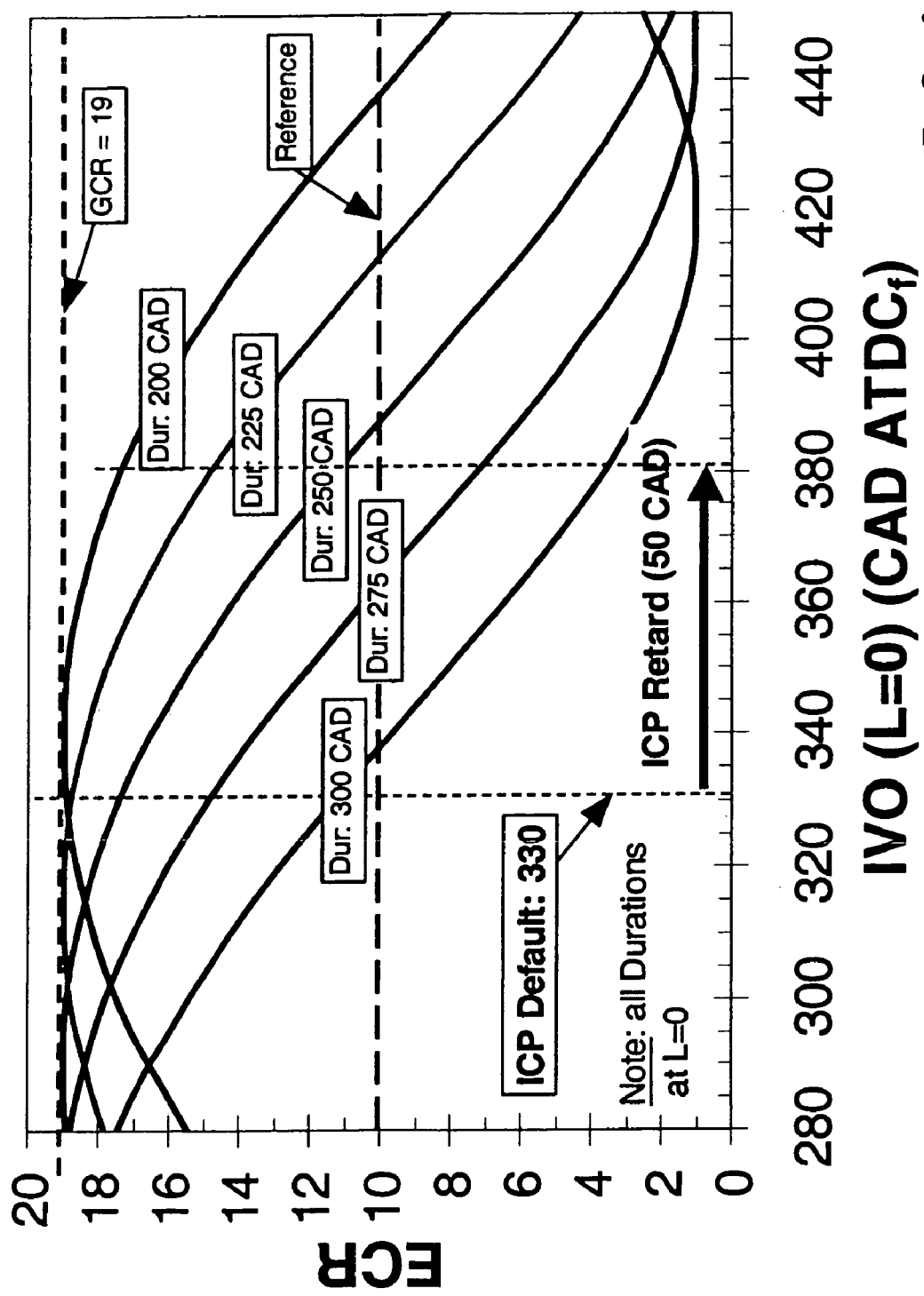
FIG. 4 is a graph of effective compression ratio (ECR) as a function of crankshaft angle after top dead center, for a variety of intake valve opening durations as governed by an intake camshaft phaser.

Referring to FIG. 4, the effective compression ratio (ECR) may be varied by varying the intake valve timing by means of an intake camshaft phaser (ICP). Such variation is shown for a variety of valve lift durations. By combining a phaser angular range of 50 crank angle degrees (CAD) with a lift duration of between 200 and 300 CAD, compression ratios between 4 and 19 are possible.

Figure 5:
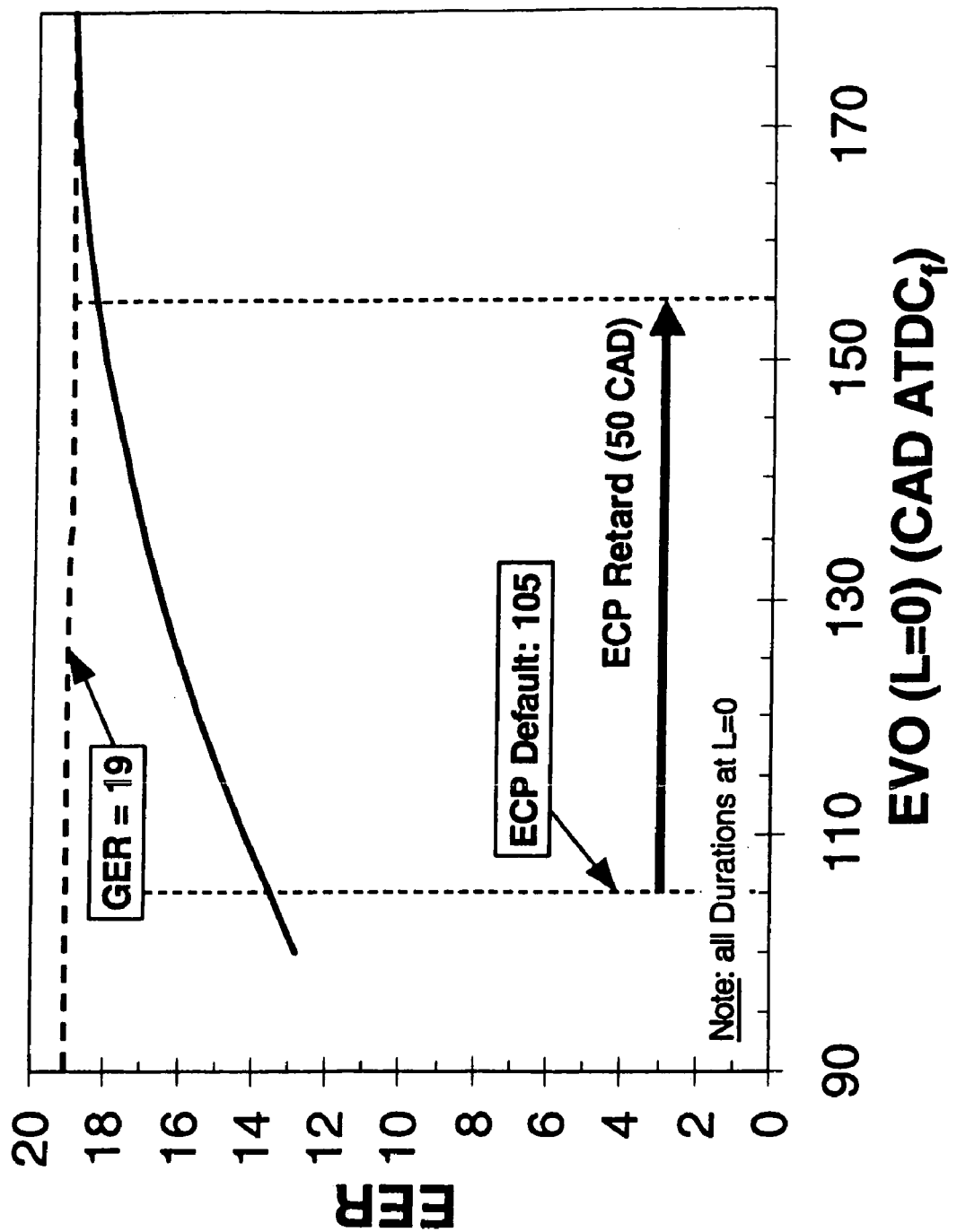
FIG. 5 is a graph of effective expansion ratio (EER) as a function of crankshaft angle after top dead center, as governed by an exhaust camshaft phaser.

Referring to FIG. 5, the effective expansion ratio (EER) may be varied by varying the exhaust valve opening timing by means of an exhaust camshaft phaser (ECP). Over a phaser angular range of 50 crank angle degrees, EER may be varied between about 13 and greater than 18.

Figure 6:
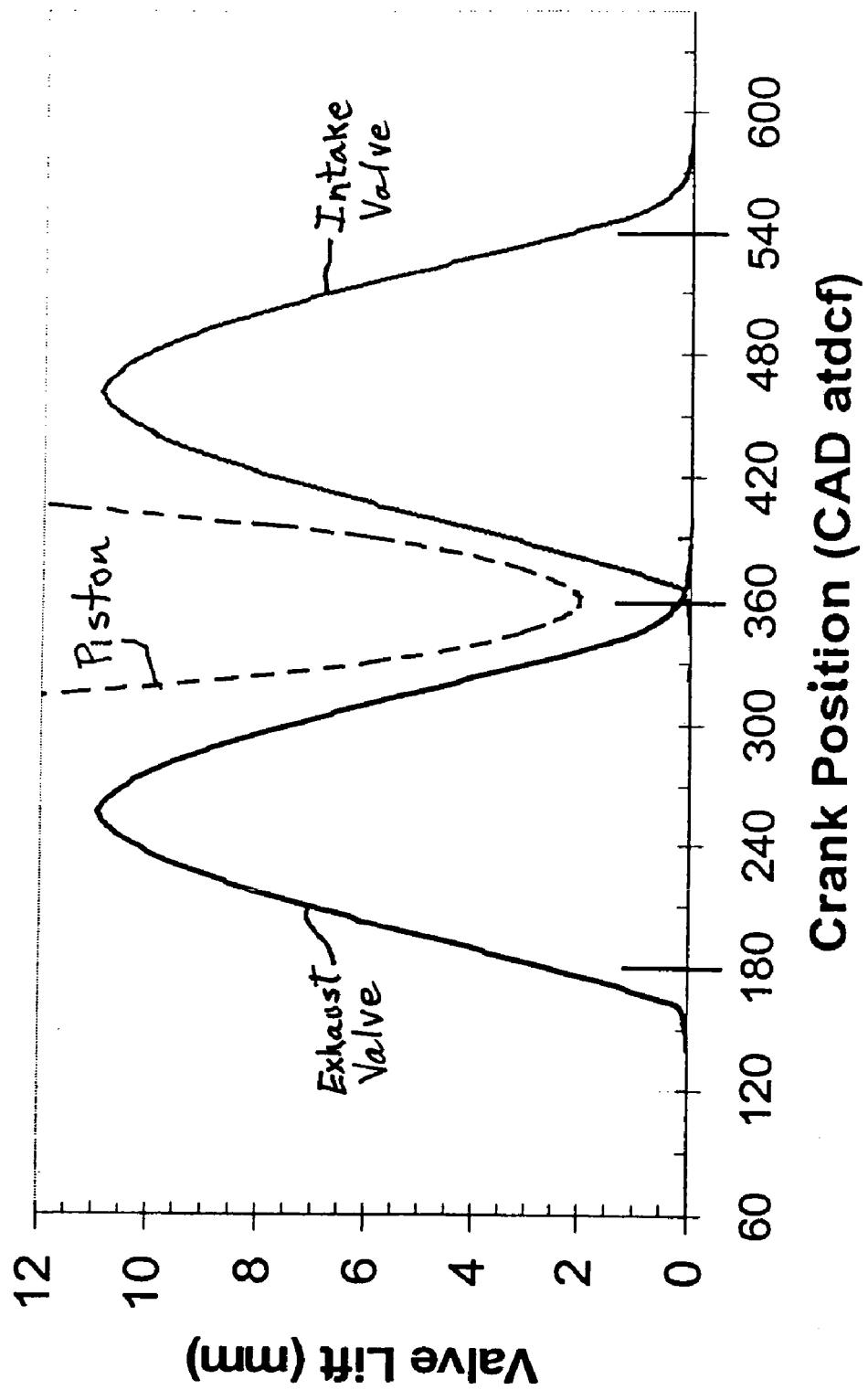
FIG. 6 is a graph showing exemplary valve lift as a function of crankshaft angle for exhaust valves and intake valves during an exemplary two-revolution cycle of a prior art conventional diesel engine.

Referring to FIG. 6, exemplary reference opening curves for the intake and exhaust valves as a function of crankshaft rotation are shown for a conventional prior art diesel engine not equipped with either variable valve actuation means or camshaft phasers. During the discussion below, the terms "early" and "late" should be understood to be with reference to the valve openings and closing shown for the prior art diesel engine.

Referring to FIG. 7, the operational states of various engine components are shown in tabular form for seven Operating Modes of an HCCI engine as described above in accordance with the invention. In a currently preferred embodiment, the intake and exhaust valve cams are ground as follows to produce the desired valve lifts, with respect to the prior art reference engine:

I1: high-lift cam, long; low-lift cam, short.
I2: high-lift cam, long; low-lift cam, zero lift.
E1: high-lift cam, long; low-lift cam, normal.
E2: high-lift cam, long; low-lift cam, normal.

Figure 8:
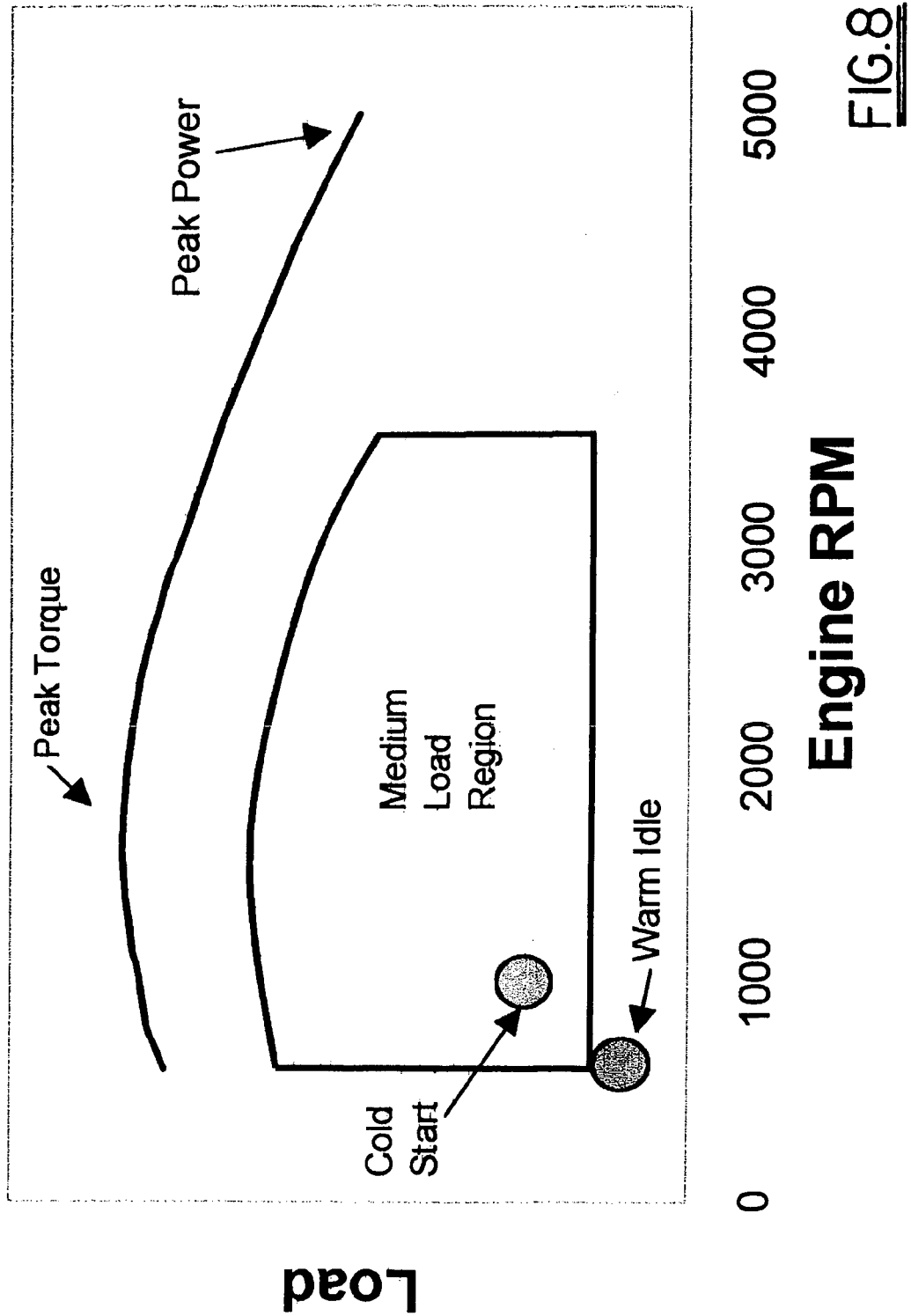
FIG. 8 is a graph showing definitions of the Operating Modes shown in FIG. 7 as a function of engine speed and engine load.

Following are the Operating Modes, which define methods of operating a CI engine in accordance with the invention; in the valve opening curves, the crank angle degree (CAD) positions are defined as 180°=BDC, 360°=TDC, and 540°=BDC. Referring to FIG. 8, the engine performance regions of the Operating Modes are approximately defined in terms of engine speed (RPM) and engine load (brake mean effective pressure, BMEP). Note that in the following Modes the optimal values for valve opening durations, valve lifts and cam lift profiles (including the exhaust cam "bumps"), and exhaust and intake phaser advances and retards may differ for specific engine applications and thus may each require specific configurations determined through simulations and/or experimentation within the capabilities of one of ordinary skill in the art.

Figure 9B:
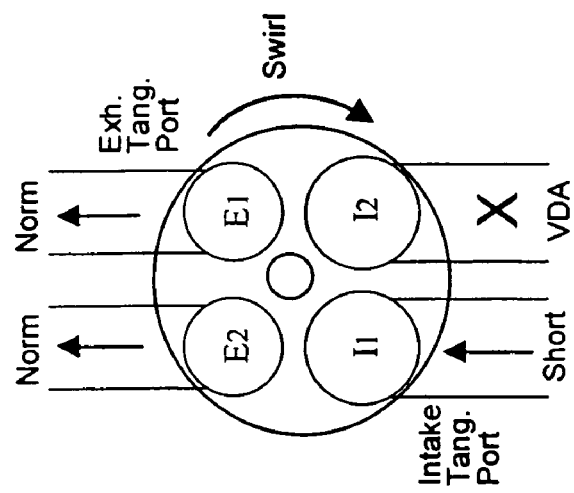
Figure 9A:
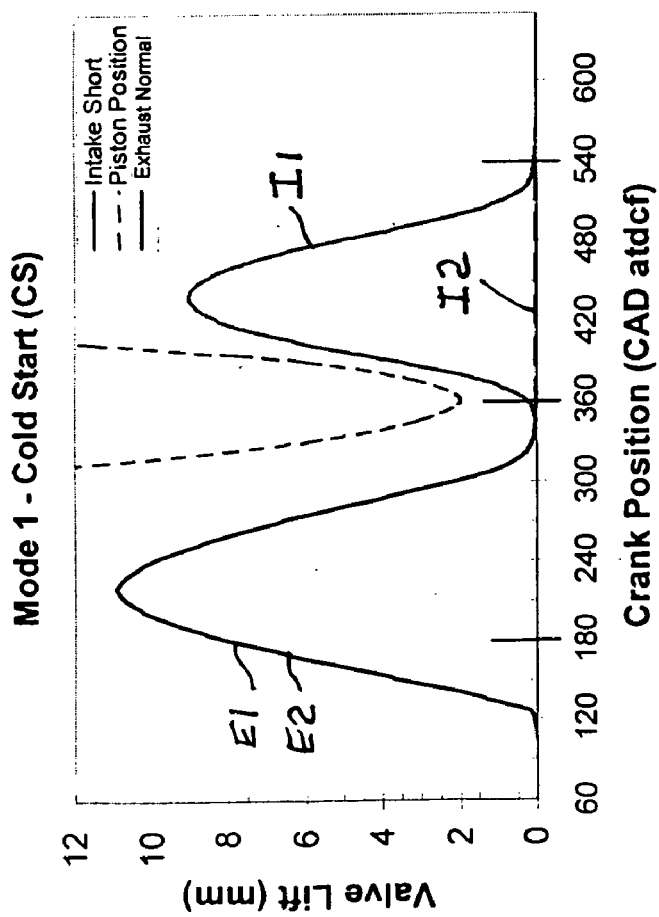

Mode 1, Cold Start (CS) The entire engine is at ambient temperature. Referring to FIGS. 7, 9a, and 9b, a strategy for starting a cold engine includes valve actuations to maximize heat generation to rapidly warm the cylinders (and cylinder gases) and the exhaust system including the exhaust catalyst, as follows:

A high effective compression ratio (ECR approx. 19) for maximum compression temperature; thus, both intake valves are at low lift and are closed near or at bottom dead center.

Early exhaust valve opening (EEVO) which effectively blows down the hot cylinder gases before expansion is complete, providing a low effective expansion ratio (EER) and early exhaust valve closing (EEVC) which traps hot burned gases in the cylinder; thus, both exhaust valves are on normal exhaust lift profiles; the exhaust cam phaser is fully advanced, preferably to about 105° and preferably as a default position; and the intake cam phaser is fully advanced, preferably to about 330° and preferably as a default position, such that exhaust/intake valve open overlap (OL) is effectively zero.

Conventional combustion strategy; thus, fuel is injected conventionally, late in the compression stroke.

Intake swirl to maximize dispersal of injected fuel; thus, the I2 valve is deactivated (zero lift lobe); I1 valve is on short lift.

No external exhaust gas recirculation (EGR) from the engine exhaust system.

In many applications, and especially in warmer climates, the conditions of Mode 1 permit the elimination of a conventional glow plug in the engine.

In Cold Start Mode, it may be further desirable to delay some or all fuel injection until the piston has passed TDC at the end of the compression stroke, resulting in reduced combustion efficiency and providing a hot exhaust gas into the exhaust catalyst, especially when the exhaust valves are opened early as well. Of course, the injection must be timed to be early enough in the power stroke that the compressed air is still hot enough to cause ignition.

Figure 10B:
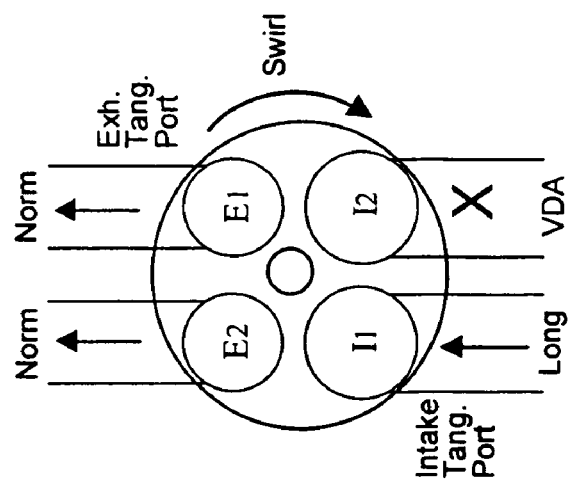
Figure 10A:
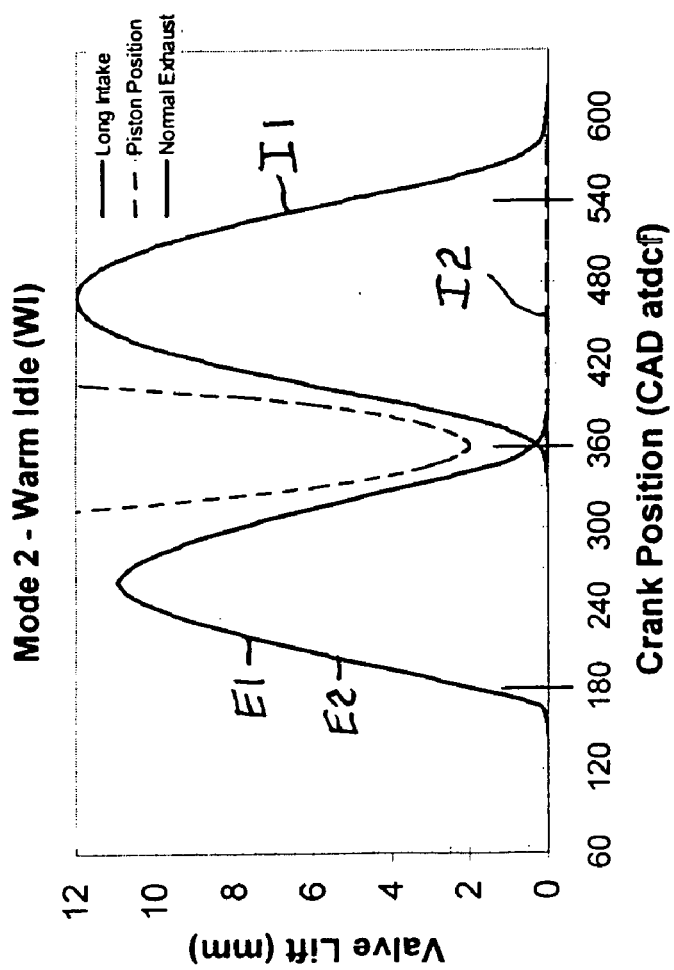

Mode 2, Warm Idle (WI) The engine is warm and stable. Referring to FIGS. 7, 10a and 10b, a strategy for operating a warm engine at idle includes;
- A lowered ECR, about 15-16. Both exhaust valves are at normal (low) lift and are closed near or at bottom dead center (EER~18).
- Full expansion for best efficiency; thus, the exhaust cam phaser is retarded.
- Intake swirl to maximize dispersal of injected fuel and promote high thermodynamic efficiency; thus, the I2 valve is deactivated (zero lift cam lobe); I1 valve is on long lift (high-lift cam lobe).
- No external EGR.

Figure 11B:
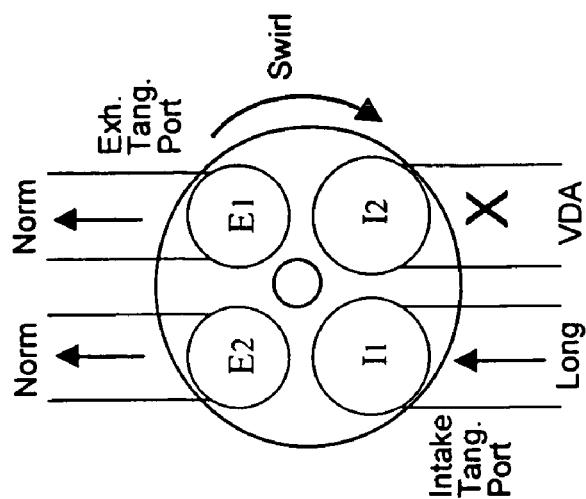
Figure 11A:
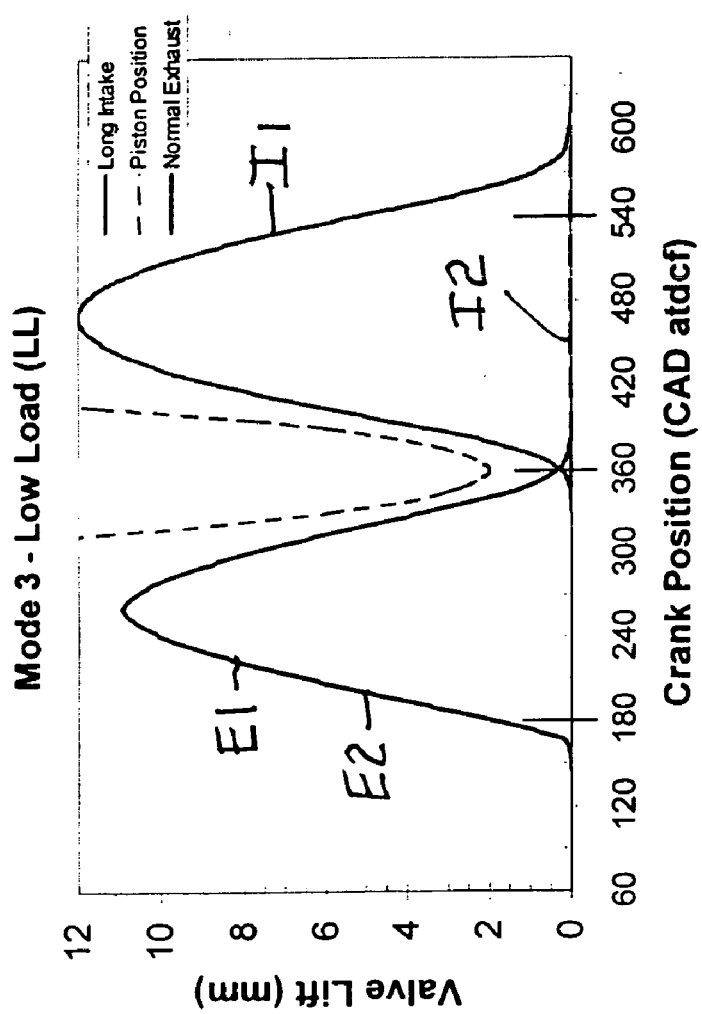

Mode 3, Low Load (LL) The engine is under a low load rather than simply idling. Referring to FIGS. 7, 11a and 11b, it is seen that the operating conditions are substantially the same as for Mode 2. Because the exhaust is relatively cold, the exhaust catalyst may be warmed somewhat by optionally advancing the exhaust phaser to advance the exhaust valve opening (EEVO) if desired with some impact on thermal efficiency.

Figure 12B:
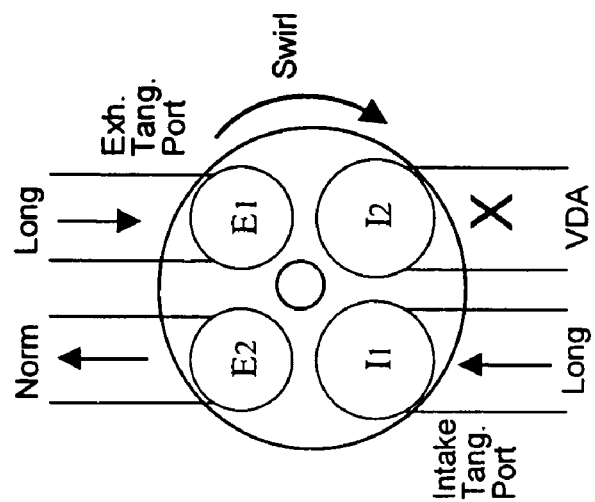
Figure 12A:
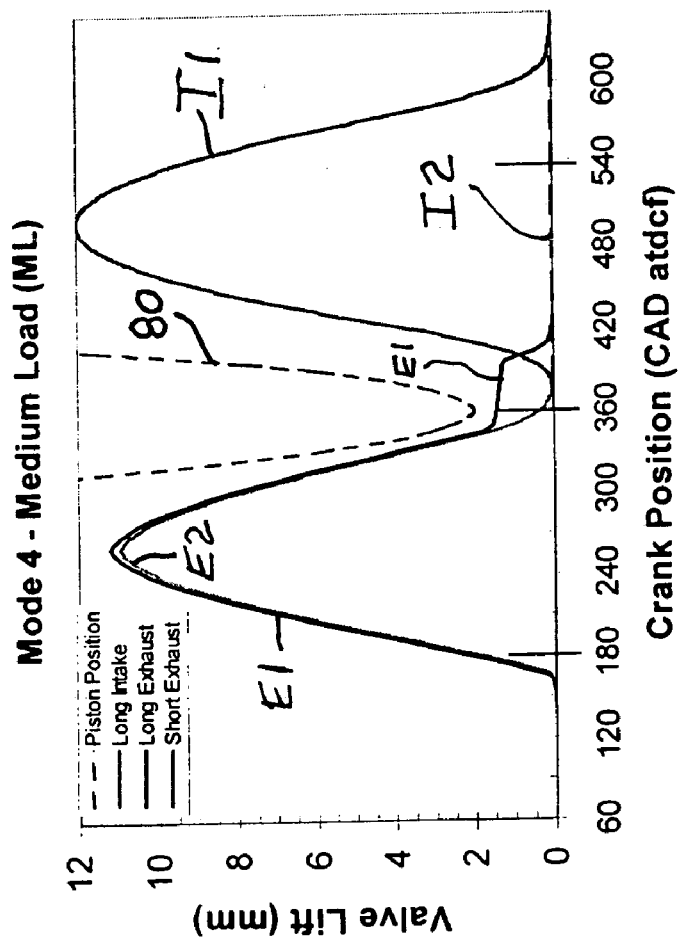

Mode 4, Medium Load (ML) This is a condition representative of Federal vehicle performance testing. It is important to minimize emissions and maximize fuel economy, which requires close control of compression ratio, expansion ratio, exhaust gas dilution, and premixed combustion conditions. Referring to FIGS. 7, 12a and 12b, a strategy for operating an engine at medium load includes
- Low ECR (approx. 10-11) and compression temperature control; thus the I1 valve is on long lift and the intake valve phaser is variably retarded such that the I1 valve does not close until after BDC.
- Intake swirl to maximize dispersal of injected fuel and promote high thermodynamic efficiency; thus the I2 valve is deactivated (zero lift cam lobe).
- High internal EGR and exhaust swirl; thus the E2 valve is on normal (low) lift and the E1 valve is on long (high) lift and the exhaust phaser is retarded.
- Precise combustion temperature control; thus the exhaust phaser is retarded. The trailing "bump" on the cam lift profile of the E1 valve occurs after TDC such that exhaust gas is inducted into the cylinder to dilute the intake charge during exhaust valve opening; external EGR is also added to help control compression (and thus ignition) temperature.
- High in-cylinder swirl in both the intake and exhaust streams to provide good mixing of injected fuel and air; thus the I2 valve is deactivated causing intake swirl as in the first three modes, and the late closing of the E1 valve causes synergistic exhaust swirl from re-induction of exhaust gas into the cylinders from the exhaust manifold.
- Homogeneous charge compression ignition via progressive and repeated fuel injection during the compression stroke; thus each fuel injector is pulsed a plurality of times, beginning relatively early in the compression stroke to provide a smooth and progressive combustion uniformly distributed over the entire combustion chamber.

It should be noted that the highly retarded exhaust valve closing nearly causes the valves to collide with the ascending piston (curve 80). To guard against catastrophic collision and engine destruction in event of a system failure, it can be desirable to provide room for the opened valves within the mixing bowl in the piston, or to recess the valve seats into the head by a distance sufficient to prevent such collision.

Figure 13B:
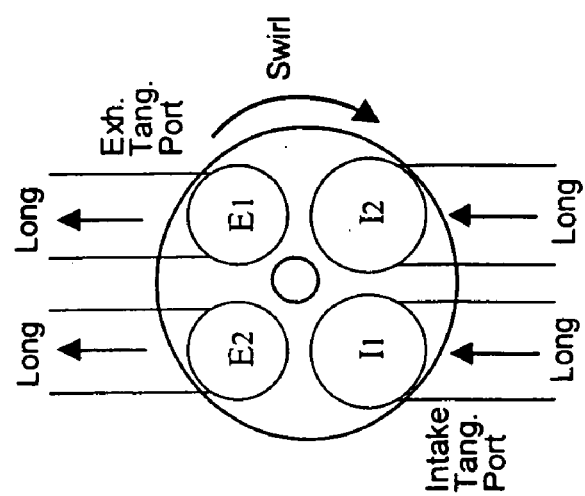
Figure 13A:
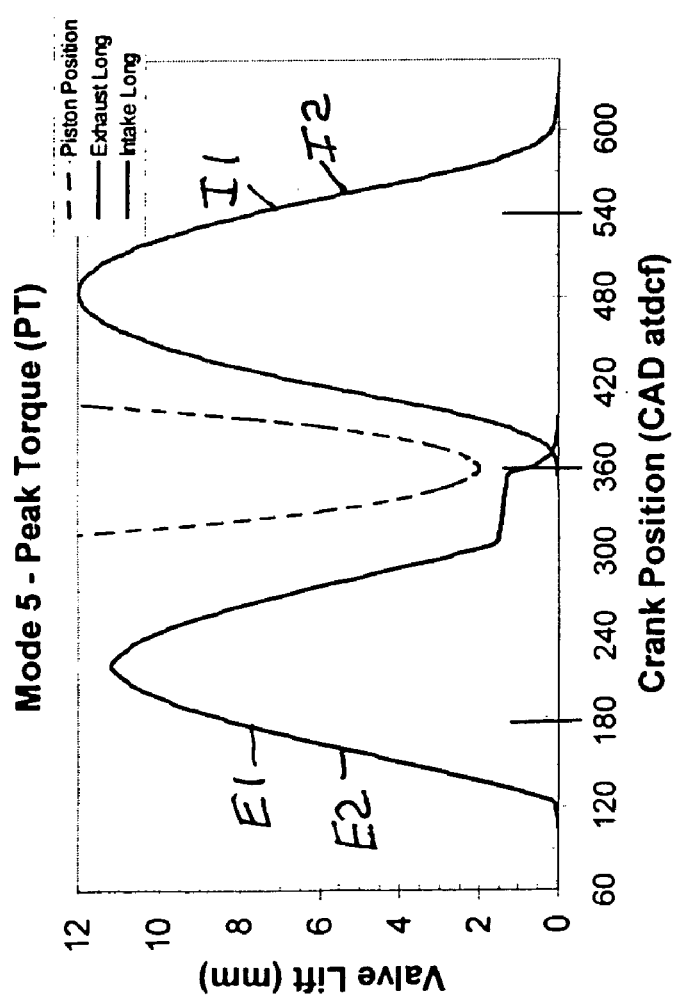

Mode 5, Peak Torque (PT) The engine is under maximum torque load. Referring to FIGS. 7, 13a and 13b, a strategy for operating an engine at peak torque includes
- Maximum boost for maximum volumetric efficiency; both I1 and I2 valves are on their long lift (high lift) cam profiles with phaser positions optimized to provide full engine breathing.
- The exhaust valves are opened early (EEVO) by advancing the exhaust phaser (ECP) to minimize exhaust pumping losses.
- No external EGR.
- Normal fuel injection.
- Valve overlap is controlled by timing of the phasers.

Figure 14B:
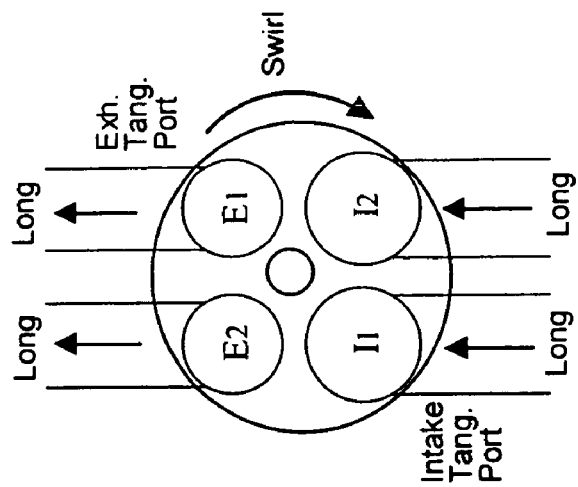
Figure 14A:
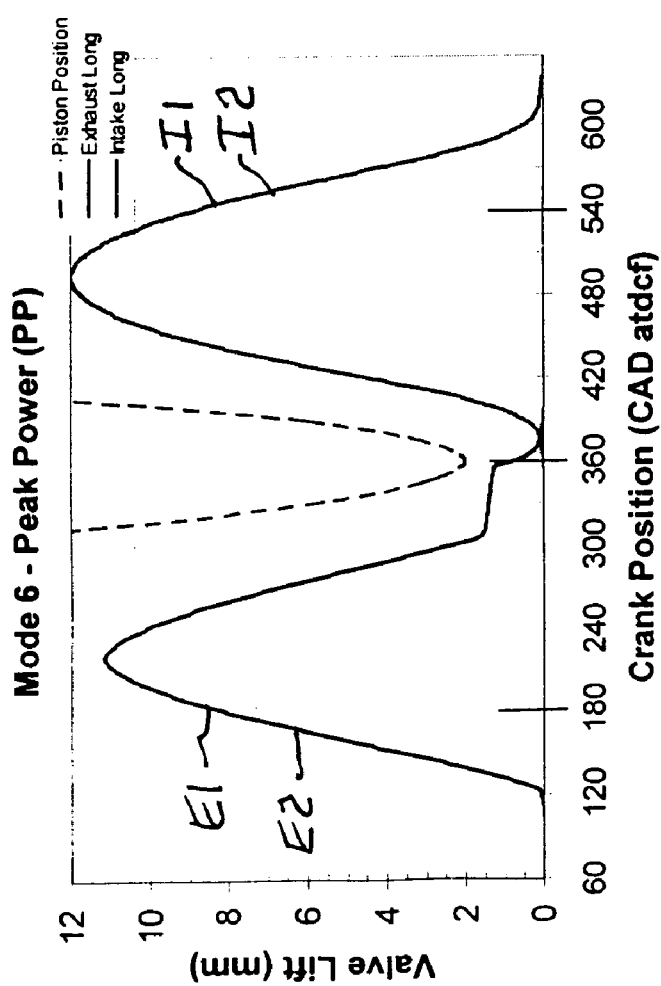

Mode 6, Peak Power (PP) Referring to FIGS. 7, 14a and 14b, Mode 6 is similar to Mode 5 (PT), except that the intake valve phaser is further retarded to improve breathing characteristics at maximum rated engine speed.

Figure 15B:
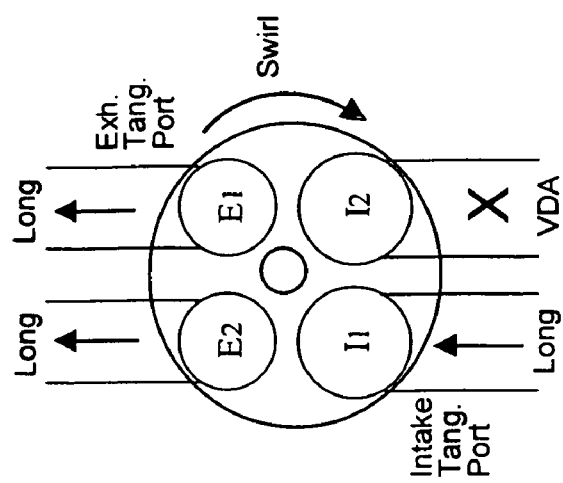
Figure 15A:
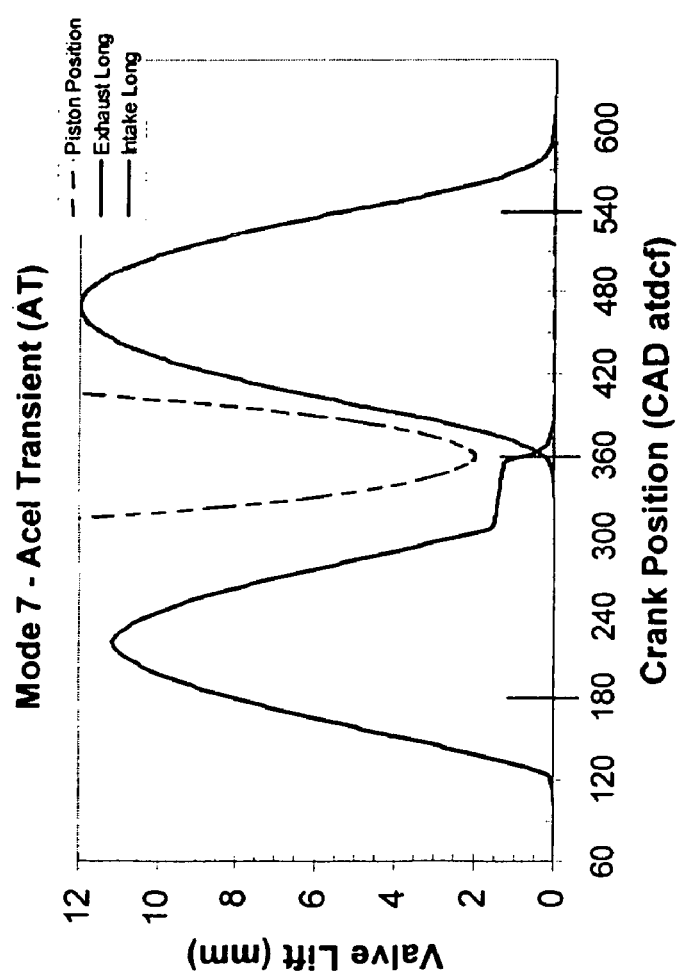

Mode 7. Acceleration Transient (AT). The transient condition in which the engine is launched from very low loads and speeds to higher power output. Referring to FIGS. 7, 15a and 15b, a strategy for rapidly accelerating an engine includes
- Increasing the trapped charge mass; thus the I1 valve is on its long profile and the intake phaser is advanced such that the ECR is approx. 15-16.
- Swirl for improved combustion; thus I2 is deactivated.
- Accelerating the turbocharger; thus both E1 and E2 are on their respective long profiles and the exhaust phaser is advanced rapidly and momentarily for EEVO.
- Fast reduction of exhaust gas in the intake manifold; thus, the timing of the phasers is controlled such that the advance in the intake phaser lags behind the advance in the exhaust phaser.
- Combustion may be either normal or premixed.

Figure 2:
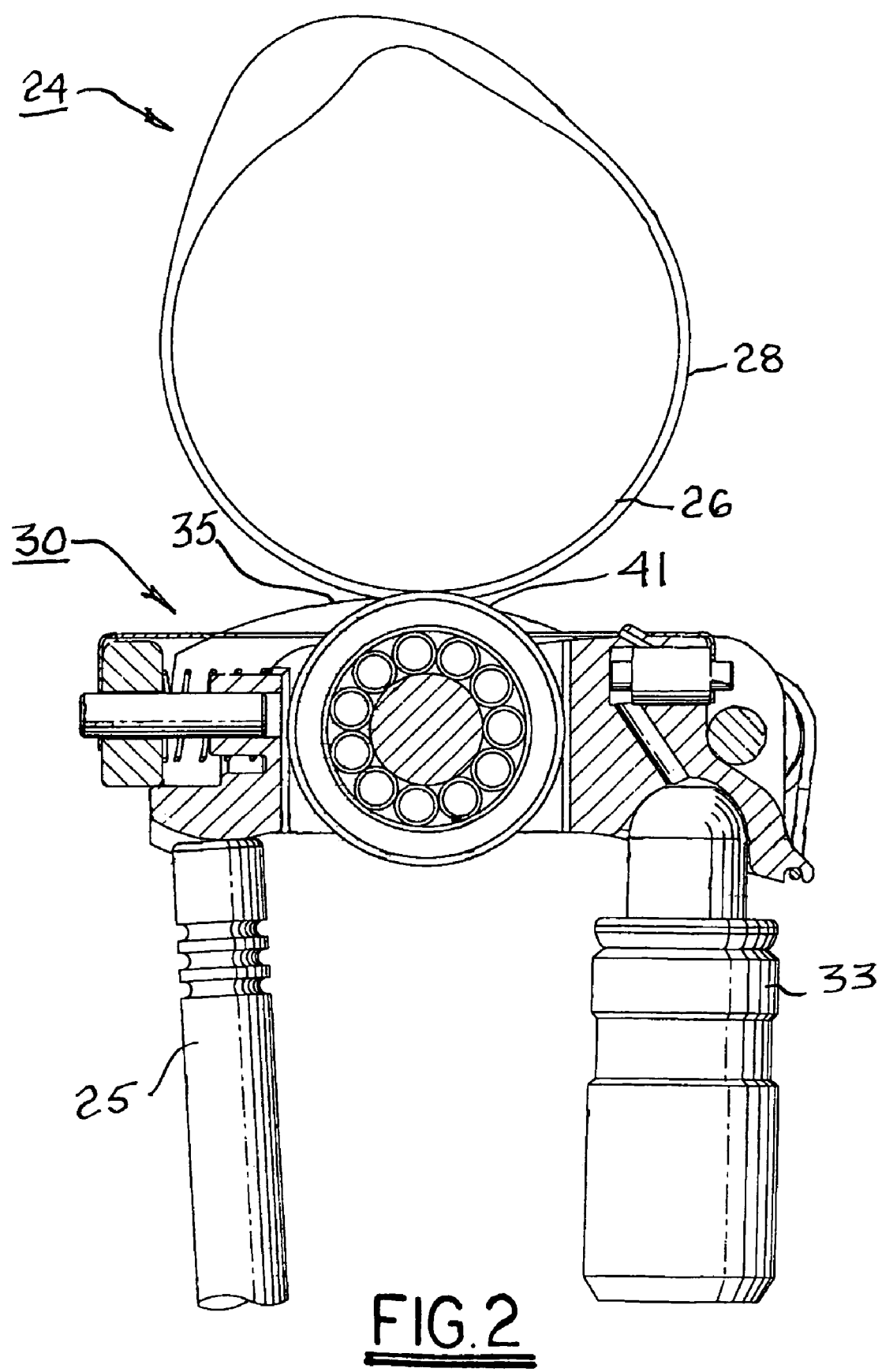
FIG. 2 is an elevational cross-sectional view of a two-step variable valve actuation valve train in accordance with the invention.
Figure 3:
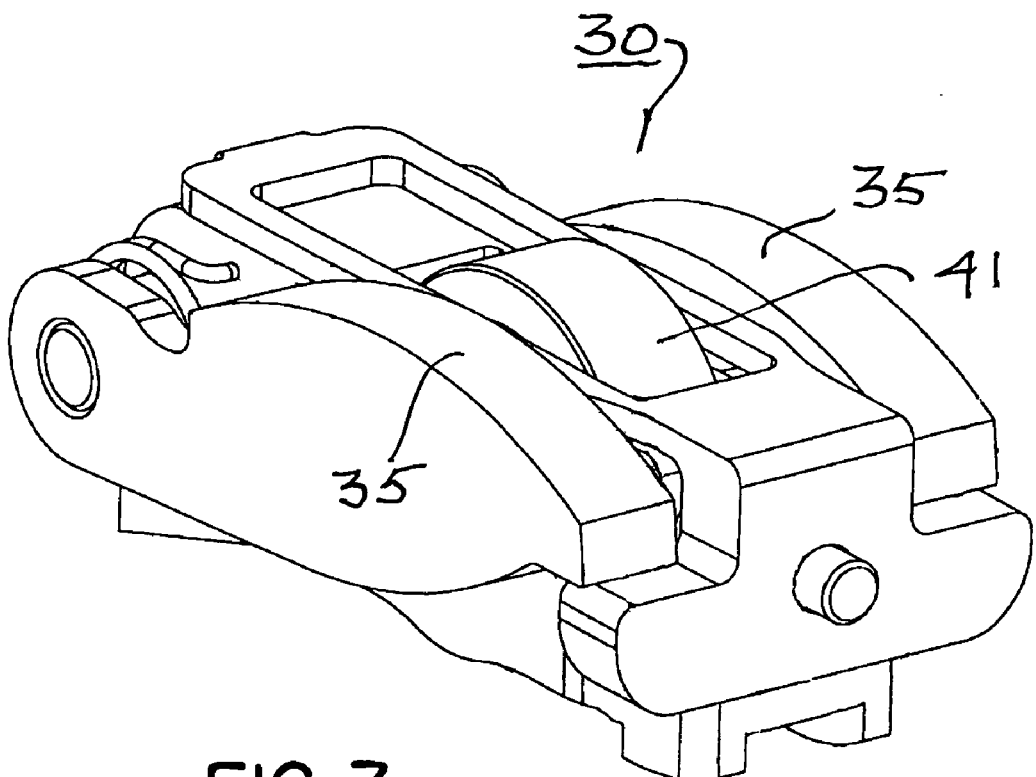
FIG. 3 is an isometric view of the roller finger follower shown in FIG. 2, showing a central roller and outboard deactuation followers having slider surfaces.
Figure 3A:
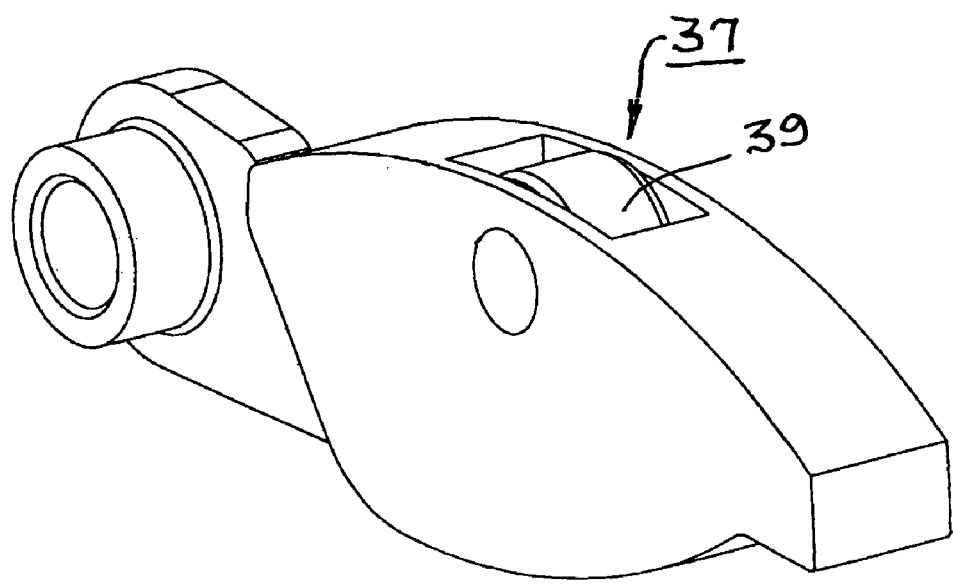
FIG. 3a is an isometric view of an outboard deactuation follower like those shown in FIG. 3 but equipped with a roller.

The above methods and benefits are predicated on an engine fully equipped as shown in FIGS. 1 through 3. However, significant (albeit reduced) benefits can be obtained from simpler, less expensive alternative engine configurations having reduced hardware requirements, and thus reduced cost and complexity.

Referring to FIG. 16, six alternative engine configurations are shown, the first five being simpler than engine 12, and their eliminated hardware and consequent lost functionalities are summarized. The alternative configurations are shown and discussed in more detail in FIGS. 17 through 22.

Figure 17:
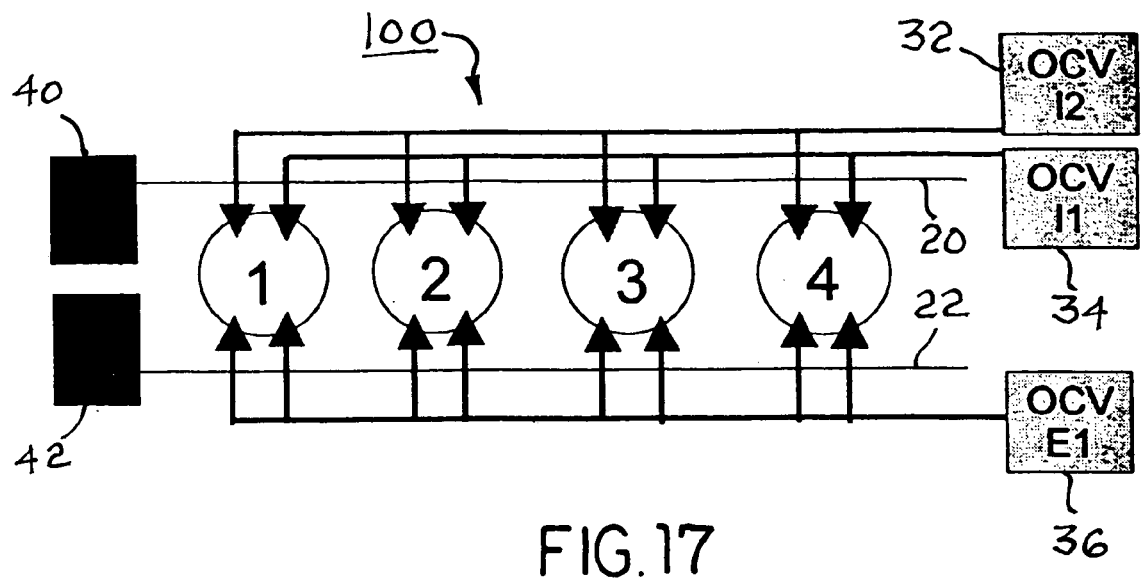
FIGS. 17 through 22 are individual schematic drawings of the six engine alternatives shown in FIG. 16.

Referring to FIG. 17, in a first alternative system 100, the intake valve system is unchanged from the parent configuration in FIG. 1, but the exhaust valve system employs a single oil control valve for all the exhaust valves, thus eliminating one oil control valve and a separate oil gallery on the exhaust side. The functional cost is that exhaust swirl capability is lost under high levels of internal EGR, as benefits Mode 4, thus reducing combustion efficiency.

Figure 18:
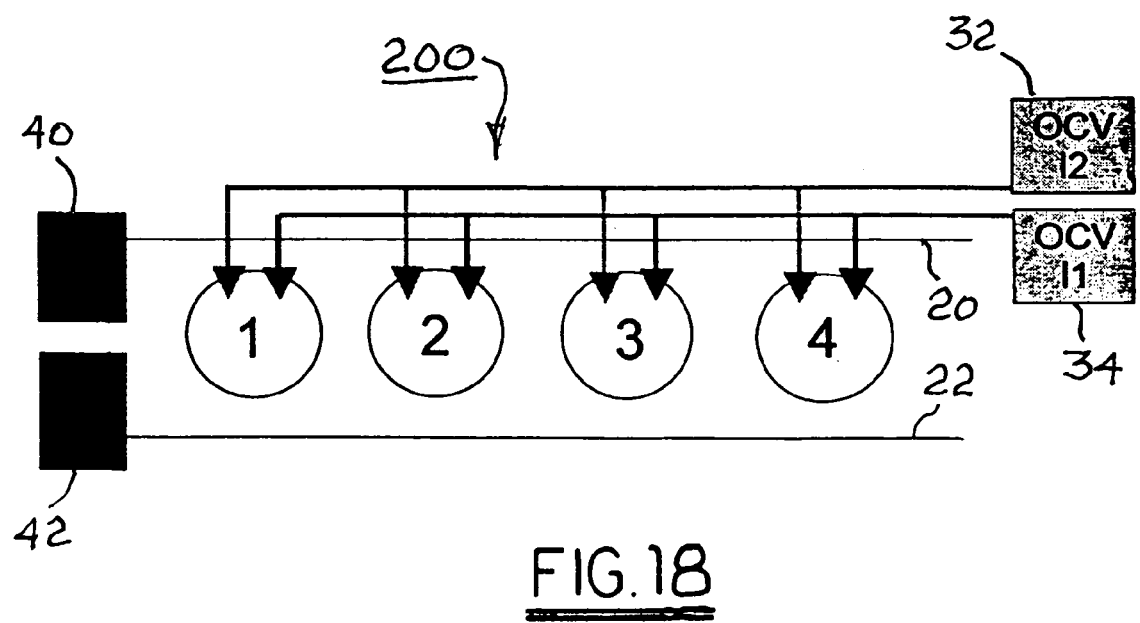

Referring to FIG. 18, in a second alternative system 200, two-step functionality is provided for only the intake valves by eliminating two (exhaust) oil control valves, all of the exhaust two-step RFFs, and an additional oil gallery on the exhaust side. The functional cost is loss of a high level of internal EGR produced in the parent configuration by re-induction of exhaust gas from the exhaust system, and the concomitant loss of high levels of exhaust swirl. The net effect is lower overall swirl levels, reducing the efficiency of premixed combustion modes.

Figure 19:
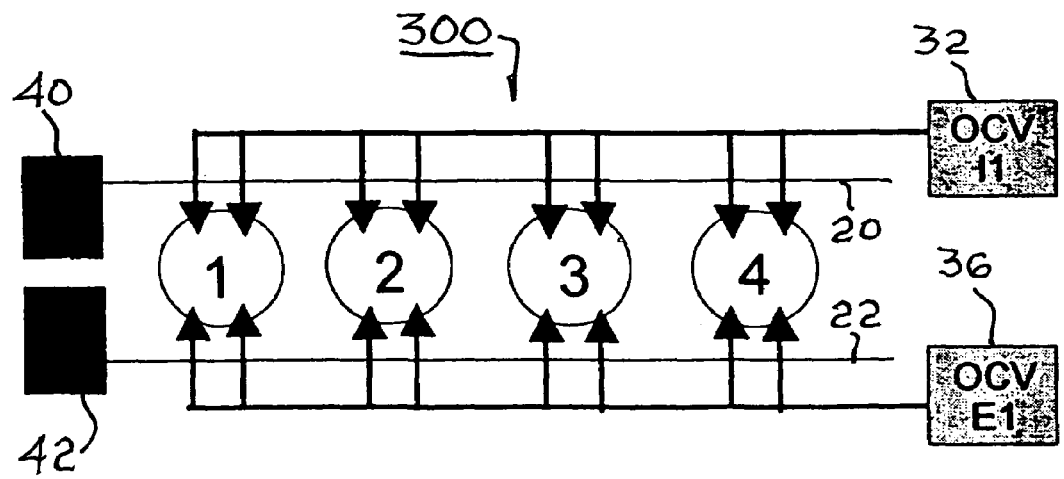

Referring to FIG. 19, in a third alternative system 300, the intake valves are functionally paired through a single oil control valve, as are the exhaust valves, for each cylinder.

Two oil control valves and two oil galleries are eliminated. Two-step functionality is provided for all the intake valves and all the exhaust valves. Significant loss of in-cylinder swirl can be partially restored by providing individual port deactivation (PDA) as in the prior art, at some additional cost and complexity.

Figure 20:
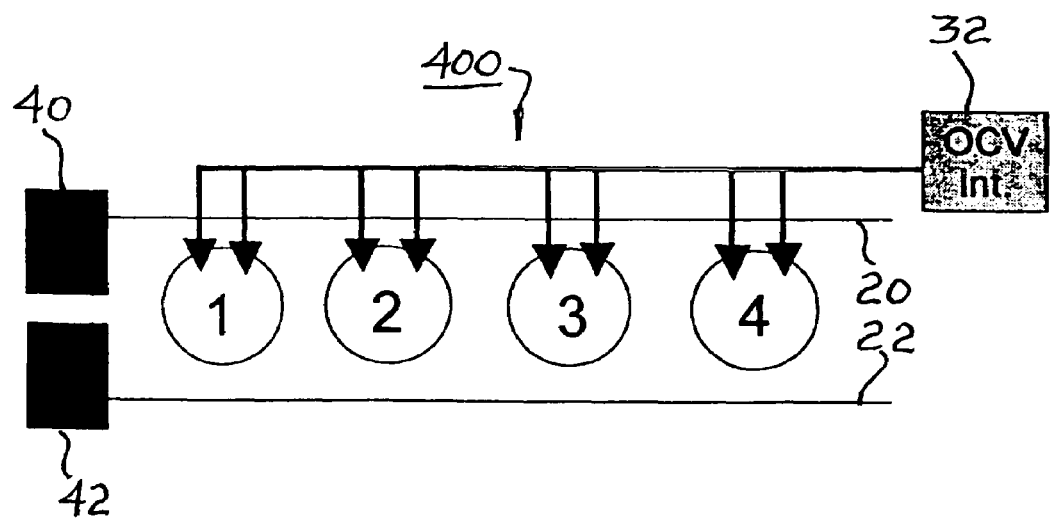

Referring to FIG. 20, in a fourth alternative system 400 for diesel operation with conventional combustion, all two-step functionality is removed for the exhaust valves, and the intake valves are functionally paired through a single oil control valve as in alternative system 300. Three oil control valves, eight two-step RFFs, and three oil galleries are eliminated. Lost is capability for high internal EGR and exhaust swirl.

Figure 21:
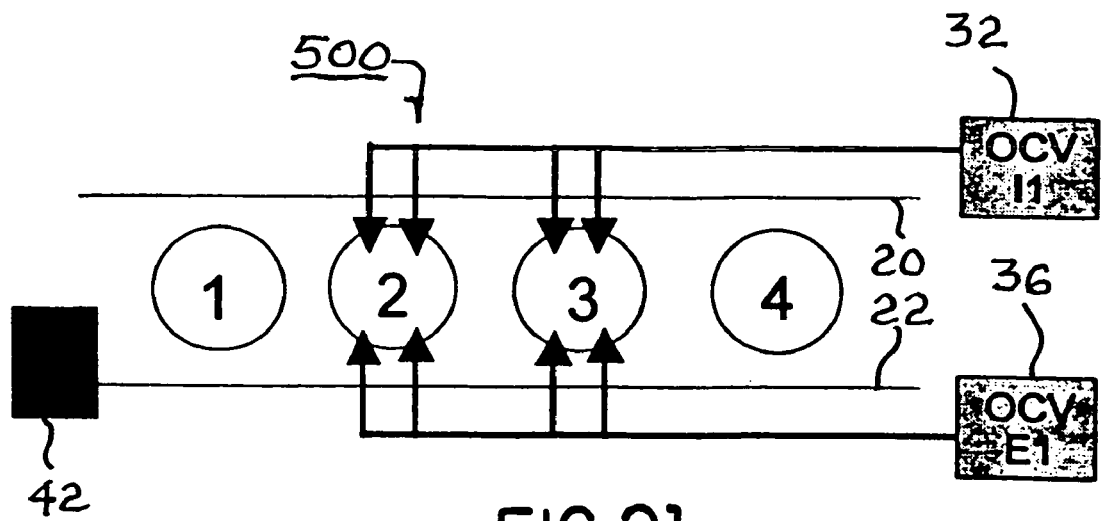

Referring to FIG. 21, in a fifth alternative system 500, cylinder deactivation is provided for half the cylinders in the engine, and phasing is provided for only the exhaust camshaft. This arrangement eliminates two oil control valves, eight two-step RFFs, two oil galleries, and the intake camshaft phaser and its oil control valve. The lost functionalities include the cold start compression ratio benefit; variable late intake valve closing for effective compression ratio control; capability for high internal EGR; valve deactivation for intake swirl, requiring a port deactivation valve; and exhaust swirl capability for high levels of internal exhaust gas recirculation.

Figure 22:
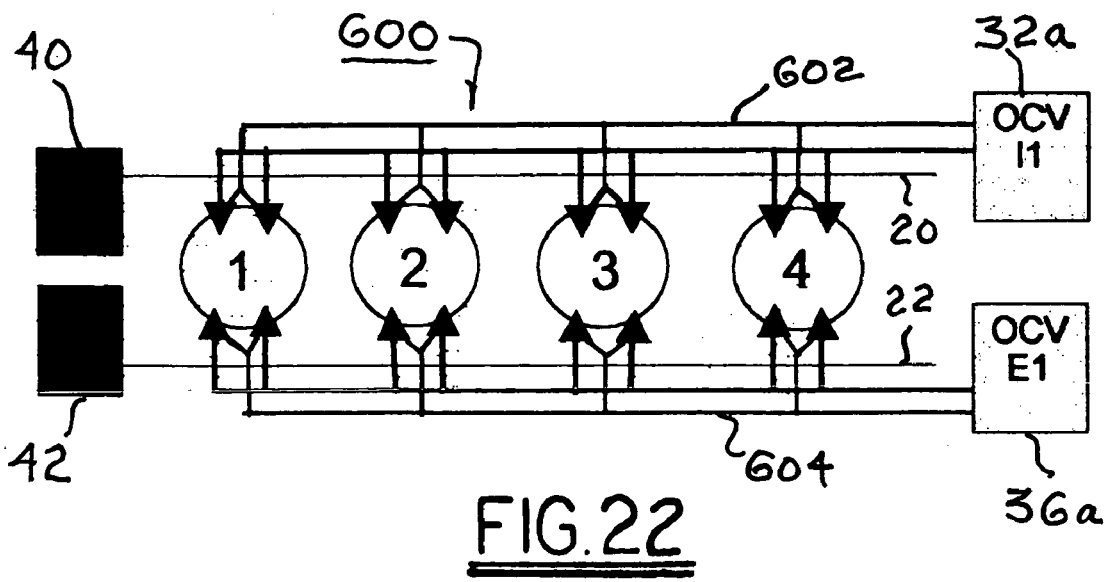
Figure 23:
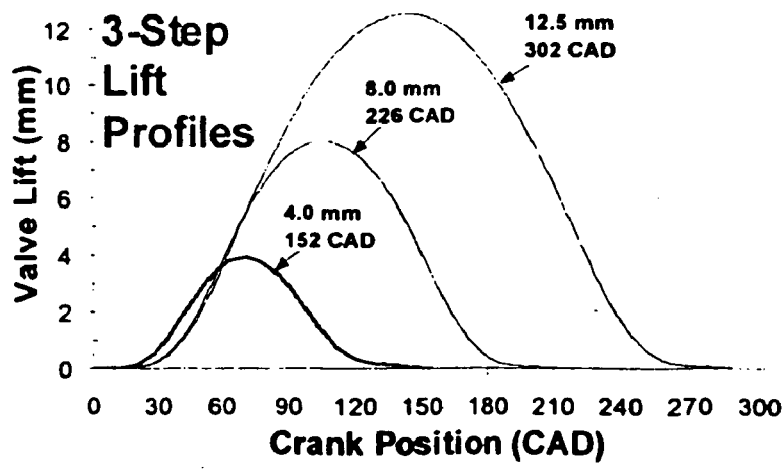
FIG. 23 is a graph showing exemplary valve lift profiles for a three-step VVA system.

Referring to FIGS. 22, 23, in a sixth alternative system 600, a three-step VVA mechanism provides a still greater range of lift combinations and valve timing. Three-step variable valve actuation of a gasoline-fueled spark-ignited engine is disclosed, for example, in U.S. Pat. No. 6,810,844, the relevant disclosure of which is incorporated herein by reference. Intake oil control valve 32a is provided with a second outlet for supplying a second oil feed via a second intake valve oil gallery 602, as required for operation of the three-step RFFs. Similarly, exhaust oil control valve 36a is provided with a second outlet for supplying a second oil feed via a second exhaust valve oil gallery 604.

The three separate lifts shown in FIG. 23 have substantially the same opening timing but variable valve closing; however, it is obvious that, by appropriate grinding of the three independent cam lobes providing the three independent lifts, the openings and closings and amplitudes of the lifts may be configured independently to satisfy a wide variety of CI engine operational requirements.

In addition, two-step functionality plus variable cylinder deactivation can be provided by use of three-step valvetrain mechanism 600 wherein the low-lift profile is zero lift (base circle) for cylinders intended for cylinder deactivation (e.g., cylinders number 2 and 3). When those cylinders are deactivated, the resulting higher load factors in the active cylinders result in desirably higher exhaust temperatures. The three-step VVA mechanism provides equal lift to pairs of the intake valves, so that intake swirl is not provided; however, individual port deactivation can be used to generate intake swirl control.

The two-step VVA strategies and methods described above in accordance with the invention, when combined with a turbocharged Miller Cycle in a compression-ignited engine, and especially in a homogenous charge compression-ignited engine:

1. Provide control of compression temperature and charge dilution over wide ranges as required by compression ignition.

2. Enable fast control of the more critical HCCI process (i.e., internal residuals, compression ratio, expansion ratio).

3. Improve cold starting and may enable elimination of glow plugs.

4. Improve full-load output of the engine across the engine speed range, especially at low speeds.

5. Improve transient response of the powertrain by accelerating the turbocharger.

6. Permit cylinder deactivation to also be performed in addition to the above-described functions when three-step RFFs and three-lobe cams are employed.

Taken together, these strategies, methods, and apparati reduce the $NO_x$ and particulate emissions of advanced diesel engines while greatly improving engine output and transient response.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An internal combustion engine using compression ignition having an intake valve camshaft and an exhaust valve camshaft, comprising:
   a) a plurality of cylinders;
   b) first and second intake valves for each of said cylinders;
   c) first and second exhaust valves for each of said cylinders;
   d) a variable valve actuator including a two-step roller finger follower for each of said intake and exhaust valves, said variable valve actuator being used for varying the opening and closing timing of each of said intake and exhaust valves during a combustion cycle of said engine operation;
   e) a two-step camshaft lobe for each of said two-step roller finger followers, said two-step camshaft lobes being disposed on at least one of said camshafts;
   f) a first intake oil control valve for controlling the actuation of two-step roller finger followers for said first intake valves;
   g) a second intake oil control valve for controlling the actuation of two-step roller finger followers for said second intake valves;
   h) a first exhaust oil control valve for controlling the actuation of roller finger followers for said first exhaust valves;
   i) a second exhaust oil control valve for controlling the actuation of roller finger followers for said second exhaust valves; and
   j) at least one cam phaser for varying the opening and closing timing of at least one of said first and second intake valves or said first and second exhaust valves during a combustion cycle of said engine operation,
   wherein operating parameters characteristic of said engine using compression ignition may be varied to improve engine performance and fuel efficiency over a plurality of Operating Modes.

2. An engine in accordance with claim 1 wherein the type of compression ignition is selected from the group consisting of conventional diesel ignition, homogeneous charge compression ignition using diesel fuel, homogeneous charge compression ignition using gasoline, and combinations thereof.

3. An engine in accordance with claim 1 wherein at least one of said Operating Modes is Cold Start.

4. An engine in accordance with claim 1 wherein said engine is fueled by a fuel selected from the group consisting of diesel fuel, gasoline, and specialty fuels.

* * * * *